US010657340B2

(12) United States Patent
Trivelpiece et al.

(10) Patent No.: US 10,657,340 B2
(45) Date of Patent: May 19, 2020

(54) SYSTEMS AND METHODS FOR IMPROVED TAG POSITION TRACKING

(71) Applicants: Craig E. Trivelpiece, Mission Viejo, CA (US); Steve E. Trivelpiece, Rancho Santa Margarita, CA (US)

(72) Inventors: Craig E. Trivelpiece, Mission Viejo, CA (US); Steve E. Trivelpiece, Rancho Santa Margarita, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/262,053

(22) Filed: Jan. 30, 2019

(65) Prior Publication Data

US 2019/0236323 A1    Aug. 1, 2019

Related U.S. Application Data

(60) Provisional application No. 62/624,160, filed on Jan. 31, 2018.

(51) Int. Cl.
| | | |
|---|---|---|
| G06K 7/10 | (2006.01) | |
| H04L 29/12 | (2006.01) | |
| G06Q 10/08 | (2012.01) | |
| G08B 13/24 | (2006.01) | |

(52) U.S. Cl.
CPC ....... *G06K 7/10366* (2013.01); *G06Q 10/087* (2013.01); *G08B 13/242* (2013.01); *G08B 13/2417* (2013.01); *G08B 13/2462* (2013.01); *H04L 61/2038* (2013.01)

(58) Field of Classification Search
None
See application file for complete search history.

(56) References Cited

U.S. PATENT DOCUMENTS

| | | | |
|---|---|---|---|
| 5,649,295 A | 7/1997 | Shober et al. | |
| 5,657,317 A | 8/1997 | Mahany et al. | |

(Continued)

FOREIGN PATENT DOCUMENTS

| | | |
|---|---|---|
| WO | 2011/135328 A2 | 11/2011 |
| WO | 2016/196029 A1 | 12/2016 |

OTHER PUBLICATIONS

International Search Report and Written Opinion dated Mar. 19, 2019 for International Application No. PCT/US19/15786.

(Continued)

*Primary Examiner* — Carlos Garcia
(74) *Attorney, Agent, or Firm* — Arent Fox LLP

(57) ABSTRACT

Systems and methods for determining a tag's position in a given area. The methods comprise: performing, by a tag reader, a standard inventory process to obtain a unique identification code for a first tag in a randomly selected timeslot; assigning, by the tag reader, a local short address to the first tag that is shorter than the unique identification code; wirelessly communicating the local short address from the tag reader to the first tag; performing, by the tag reader, an enhanced inventory process to receive a ping command response signal including the local short address from the first tag in an assigned timeslot; and determining a first position of the first tag in the given area based on the phase of the ping command response signal.

26 Claims, 11 Drawing Sheets

(56) References Cited

U.S. PATENT DOCUMENTS

| | | | |
|---|---|---|---|
| 6,301,338 B1 * | 10/2001 | Makela | H04M 1/6505 379/67.1 |
| 2010/0127829 A1 | 5/2010 | Daneshmand et al. | |
| 2012/0222103 A1 * | 8/2012 | Bliding | G07C 9/00103 726/7 |

OTHER PUBLICATIONS

Hadjer Saadi et al., "TDMA-SDMA-based RFID algorithm for fast detection and efficient collision avoidance," International Journal of Communication Systems, vol. 31, No. 1, Aug. 7, 2017, p. e3392, X0055571027, GB ISSN: 1074-5351, DOI: 10.1002/dac.3392.

\* cited by examiner

SYSTEMS AND METHODS FOR IMPROVED TAG POSITION TRACKING

CROSS-REFERENCE TO RELATED APPLICATIONS

The present application claims priority to U.S. Provisional Patent Application having Ser. No. 62/624,160 which was filed on Jan. 31, 2018. The content of this U.S. Provisional patent Application are incorporated herein in its entirety.

BACKGROUND

Statement of the Technical Field

The present disclosure relates generally to tag based security and inventory systems. More particularly, the present disclosure relates to implementing systems and methods for improved tag position tracking.

Description of the Related Art

Using Radio Frequency Identification ("RFID") tags for tracking of items going in or out of a retail store or secured location is often difficult. The RFID readers and pedestals often broadcast a signal up to 30 feet and are not very directional. It is difficult to determine precise direction and motion of tags during the 2 or 3 seconds that a tag is exiting a location. Failure to properly determine the position and direction of motion of the tag will result in the lack of a valid alarm, a false alarm or incorrect analytics about tag motion.

Current technology supports finding the relative position of an RFID tag using Radio Frequency ("RF") phase and angle determinations but the problem is the protocols and speeds limit this to only a few tags and must be in an environment that is free of all other background tags. These restrictions prevent this technology from being effective in a retail situation or real world environment.

Single tags can be selected for reading using the current technology but commands for that are 3 times slower than normal inventory commands so a process that is already too slow is made 3 times slower.

SUMMARY

The present document concerns implementing systems and methods for determining a tag's position in a given area. The methods comprise: performing, by a tag reader, a standard inventory process to obtain a unique identification code (e.g., an Electronic Product Code ("EPC")) for a first tag in a randomly selected timeslot; assigning, by the tag reader, a local short address to the first tag that is shorter than the unique identification code; wirelessly communicating the local short address from the tag reader to the first tag; performing, by the tag reader, an enhanced inventory process to receive a ping command response signal including the local short address from the first tag in an assigned timeslot; and determining a first position of the first tag in the given area based on the phase of the ping command response signal.

In some scenarios, the local short address comprises less than a total number of bits contained in the unique identification code which facilitates to track of moving tags.

In those or other scenarios, the standard inventory process comprises the following communication operations: communicating a query message from the tag reader; receiving a response message communicated from the first tag in a time slot having a number that matches a random number generated by the first tag; communicating an acknowledge message from the tag reader; and receiving the unique identification code and overhead bits communicated from the first tag in response to the acknowledge message.

The enhanced inventory process comprises the following communication operations: communicating a ping command from the tag reader that includes instructions for the first tag to send the ping command response signal during the assigned timeslot of a plurality of contiguous timeslots; and receiving the ping command response signal sent from the first tag during the assigned timeslot. The enhanced inventory process may be repeated by the tag reader to determine at least one second position of the first tag in the given area. The first tag's path of travel through the given area may be determined based on the first position and the at least one second position.

In those or other scenarios, the first tag communicates the ping command response signal only if the first tag is in motion. Additionally or alternatively, the first tag is added to a list of moving tags with assigned local short addresses that is maintained by the tag reader. The assigned local short addresses are associated in the list with respective unique identification codes for the moving tags. The first tag may be removed from the list when the first tag is no longer in motion, that first tag is no longer responding to ping commands sent from the tag reader, or a collision event occurs that involves the first tag. The first tag may be re-assigning another local short address when a collision event occurs that involves the first tag. A unique reader code assigned to the tag reader may be included in the local short address.

BRIEF DESCRIPTION OF THE DRAWINGS

The present solution will be described with reference to the following drawing figures, in which like numerals represent like items throughout the figures.

DETAILED DESCRIPTION

Figure 1:
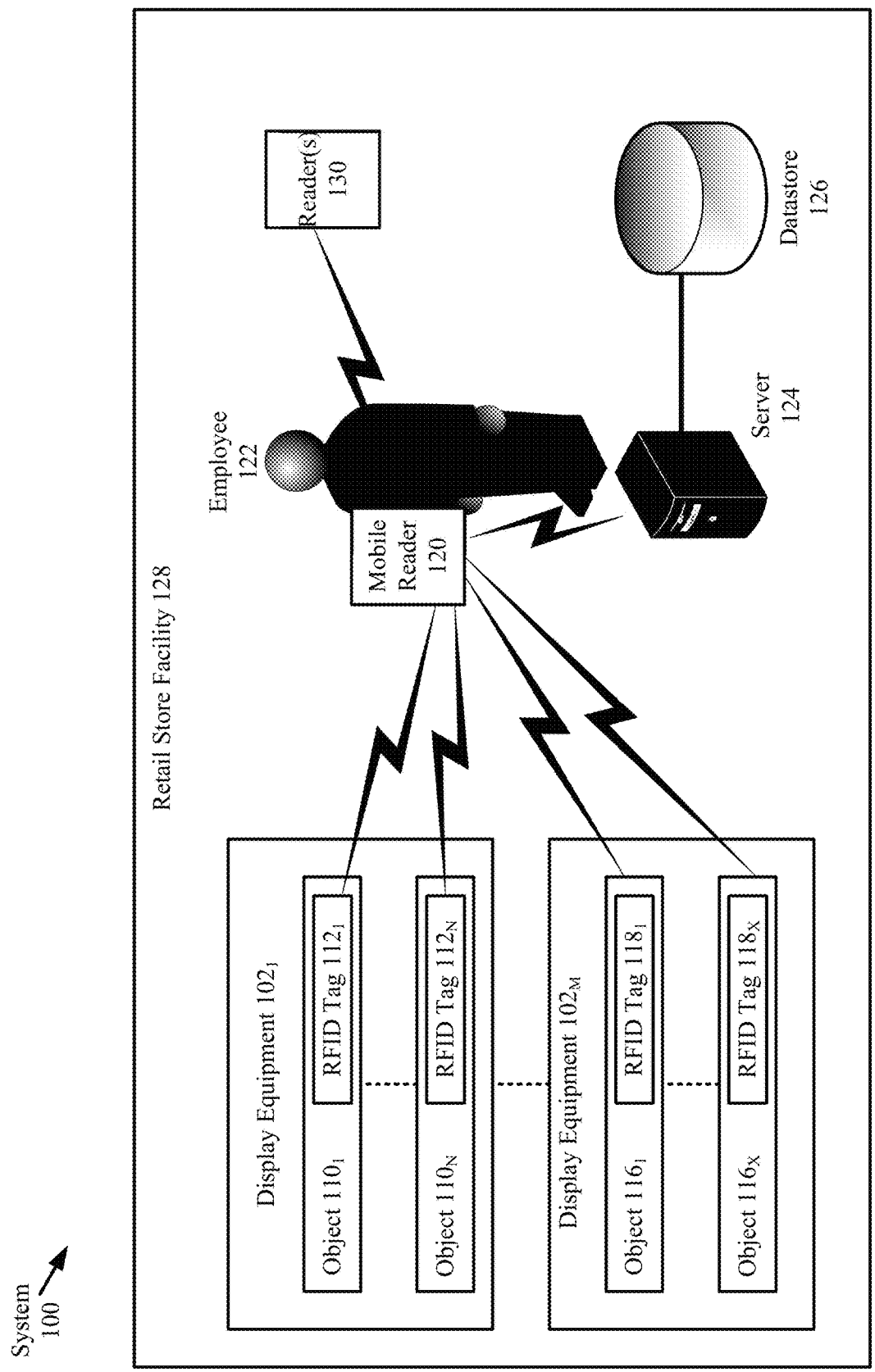
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

RFID tags have been widely adopted for tagging items of value in retail stores and used for inventory tracking, checkout and loss prevention. The problems with the current implementations fall far short of what the original vision of how an RFID enabled store might be able to track items. The original vision was to attach a passive RFID tag attached to an item so that (1) a retail store is able to track the items location and movement therein, (2) a Point Of Sale ("POS") is able to obtain details about the item, and (3) an enterprise system is able to obtain knowledge of when and where the item exits the retail store. Functionality (3) allows an enterprise system to issue an alarm if the item is exiting the retail store without being successfully purchased.

The desired features of a solution to the above stated problems of current implementations include, but are not limited to: an ability to track the position and motion of tags throughout a facility (e.g., track tags as they move from stock rooms to changing rooms, POS stations, and exits); an ability to track items that have been moved by a consumer or store employee; and/or an ability to provide store intelligence on items of interest and their motion.

A store environment makes tracking the motion of sufficient tags extremely difficult since: (a) thousands of tags are often distributed around the store while only a small percentage of the tags are in motion; (b) RFID reader protocols make separating tags in motion from other tags very difficult; (c) multiple readers with overlapping Fields Of Views ("FOVs") interfere with each other when attempting to read tags and segment tag populations in a manageable manner; (d) only 1 or 2 seconds is(are) available to detect a tag leaving an exit of the store so there is not enough time to read the tags in motion often enough to determine their location and whether their exiting the store; and (e) motion of people in the store continually cause blockage of RF signals and reflections which makes tags seem to appear and disappear constantly.

There are technical issues involved in how the RFID protocols and RFID tags function in a store environment that must be addressed to solve the above mentioned problems with conventional systems. The current Electronic Product Code ("EPC") Gen2 specification is not sufficient for locating and tracking the motion of actively moving tags in a store environment where thousands of tags may be in the FOV. What is needed is a proprietary reader/tag pair that can default to EPC capability but can use a mode with extended capability so that the vision of actively tracking tags can be achieved. Both the readers and the new tags should be backward compatible with existing EPC standard readers and tags.

There are quite a few issues that prevent this ability to track the location of a large number of tags in real-time. With a large population of tags, it is almost impossible to read them a sufficient number of times to determine location or exit from a store. For example, in some scenarios, each tag needs to be reliably read 4-5 times per second to determine location and motion. The process of tracking a set of tags is slow because of the EPC inventory method and because long EPC codes (128 bit and growing) and associated overhead (60 bits) must be read. The only way to read and identify a specific tag requires continually reading the entire EPC code including the overhead. The process of tracking an individual tag is also slow because the EPC formats are almost three times slower when addressing signal tags. Tracking groups of tags is not deterministic. An inventory method of random tag slotting and response can produce large timing differences between successive reads of the same tag or long periods of time before reading a specific tag. These limitations of the EPC protocol allows for tracking 1-5 tags and only when less than 10 tags are in the RFID readers FOV. Basically, it is not possible in a store environment to track tag motion without some changes.

In view of the forgoing, there is a need for a method to quickly and easily identify and isolate tags in motion. While only looking at the tags in motion, a method is needed that can read them often enough to determine accurate positions using phase change detection. These methods can be achieved by: providing tags that will only respond to special RFID tag reader commands when in motion; and/or increasing the rate at which the locations and motion of tags are determined through the use of modified addressing and inventory reader commands.

The present solution generally concerns systems and methods for improved tag position tracking. The present solution provides a way to enable the use of RF phase position for the stated purpose. In order to enable the RF phase position utilization, the present solution is able to (1) limit the enquiries to only tags of interest, (2) read tags much faster, and (3) deterministically read tags so that each tag can be read enough times during the 2 or 3 seconds to accurately and reliably determine the location and path.

The present solution is implemented by a tag reader configured to read tags of interest that are each assigned a short, local address just large enough to handle the tags in motion or all the tags in FOV (e.g., 10 bits (as opposed to 128, 192, or 256 bits) so that the speed of tag reads is increased by 16 times). During operations, the tag reader pings the tags of interest using the short address so phase/position information can be read very quickly. In effect, the tag reader is able to monitor a plurality of tags of interest (e.g., 500 tags) near an access point of a facility (e.g., an exit). The monitoring involves reading each tag a plurality of times (e.g., 10) per second to accurately and reliably determine position, motion and path. With this new information, highly accurate alarming and tracking is achieved by the tag readers. The tags and tag readers of the present solution are designed to be backwards compatible with conventional tags and tag readers.

In the present solution, groups of tags are pinged in a deterministic (i.e., the tag reader always reads the same, selected tags in the same order and timing) and reliable (i.e., no tag transmission conflicts) manner. Current RFID technology (1) is random in the order of reading, (2) experiences tag collisions (misses tags) and dead air time, and (3) has random timing between reads for the same tag. This makes reliable and accurate phase positioning nearly impossible with the current technology.

Occasional reading of tag positions can determine if the tags are stationary or should be tracked. The tags' short addresses could be segmented into known moving and background tags to speed up monitoring of stationary background tags to see when they start moving. Additionally or alternatively, a motion based communication scheme can be employed to isolate moving tags versus stationary tags. For example, tags only respond to special reader commands when motion is detected by internal sensors thereof. This can also be used for determining the location of all the inventory of a store more quickly.

Illustrative System

Referring now to FIG. 1, there is provided an illustration of an illustrative system 100. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow improved item and/or tag locating and position tracking within a facility. As shown in FIG. 1, system 100 comprises a Retail Store Facility ("RSF") 128 in which display equipment $102_1, \ldots, 102_M$ is disposed. The display equipment is provided for displaying objects (or items) $110_1$-$110_N$, $116_1$-$116_X$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

At least one reader 120 is provided to assist in locating an object $110_1$-$110_N$, $116_1$-$116_X$ within the RSF 128. The mobile reader 120 comprises a handheld RFID reader capable of being carried by an individual (or store employee) 122 or an RFID reader capable of being attached or coupled to the individual 122. The present solution is not limited in this regard. In other scenarios, the mobile reader 120 comprises a robotic RFID reader or a standard set of stationary readers.

As shown in FIG. 1, RFID tags $112_1$-$112_N$, $118_1$-$118_X$ are respectively attached or coupled to the objects $110_1$-$110_N$, $116_1$-$116_X$ (e.g., pieces of clothing or other merchandise). The mobile reader 120 is generally configured to read RFID tags $112_1, \ldots, 112_N$, $118_1, \ldots, 118_X$. The RFID tags are described herein as comprising single-technology tags that are only RFID enabled. The present solution is not limited in this regard. The RFID tags can alternatively or additionally comprise dual-technology tags that have both EAS and RFID capabilities. Also, the RFID tags can be replaced with EAS tags having a communications means other than RFID.

Notably, the mobile reader 120 is configured to determine and track its location within the RSF 128 as it is being moved about therein. By correlating the mobile reader's RFID tag reads and locations within the RSF 128, it is possible to determine the location of objects $110_1, \ldots, 110_N$, $116_1, \ldots, 116_X$ within the RSF 128 with a relatively high degree of accuracy. Accordingly, RFID tag read information and mobile reader location information is stored in a datastore 126. This information can be stored in the datastore 126 using a server 124. Server 124 will be described in more detail below in relation to FIG. 3.

The RFID tags $112_1, \ldots, 112_N$, $118_1, \ldots, 118_X$ are assigned unique identification codes (e.g., Electronic Product Codes ("EPCs")). The unique identification codes allow the RFID tags to be backwards compatible with existing tags and tag readers. Each RFID tag $112_1, \ldots, 112_N$, $118_1, \ldots, 118_X$ is also assigned a local short address (e.g., ≤10 bit addresses) after its unique identification code (e.g., EPC) has been read for the first time by the mobile reader 120. The assigned local short addresses allow tag reads to be significantly faster (e.g., 16 times faster). The assigned local short addresses are stored in the tags' persistent memory (e.g., Random Access Memory ("RAM")) for a given period of time (e.g., at least 1 minute) or held during normal powered cycles. The assigned local short addresses respectively map to the EPCs.

The mobile reader 120 maintains a first list of RFID tags (e.g., those in motion), selects local short addresses to be assigned to the RFID tags in the first list starting from 1 in a contiguous manner, coordinates the assignment of the selected local short addresses to the RFID tags (e.g., moving tags) with other RFID readers so as to minimize collisions, and maintains a second list of RFID tags (e.g., those in motion) that have been assigned local short addresses. In the event a collision occurs, the mobile reader 120 (a) removes the RFID tag at issue from the second list, (b) re-assigns a local short address to the RFID tag at issue, and/or (c) adds an entry in the second list indicating the local short address re-assignment. The mobile reader 120 removes entries for an RFID tag from the first list and/or second list when the RFID tag is no longer in motion or is no longer responding to ping commands sent from the mobile reader. The ping command includes instructions for the RFID tags to each send a ping command response including a respective local short address during an assigned timeslot of a plurality of contiguous timeslots.

The mobile reader 120 uses the ping command response to detect phase offsets or differences. A phase measurement can be performed in 200 micro-seconds per RFID tag depending upon overhead and synchronization. Using the ping commands, the mobile reader 120 is able to obtain many phase samples per RFID tag per second while tracking a relatively large number of RFID tags (e.g., 100's of tags). The mobile reader 120 may communicate EPCs, local short addresses and phase information to other readers 130 to provide for a uniform local addressing scheme and/or to server 124 for further processing (e.g., to provide an overall view of all moving tags in a facility) and/or storage in datastore 126.

In some scenarios, each reader 120, 130 has a unique reader code assigned thereto. The unique reader code is included in the local short address so that the local short address is reader specific. The reader specific local short addresses allow the RFID tags to support multiple reader addresses simultaneously. This reader specific short addressing scheme eliminates the need for the reader synchronization.

A map can be generated and displayed by the mobile reader 120 to assist an individual 122 with having knowledge of tag or object locations/positions with the RSF 128. In this regard, the map can comprise: (1) visual lines designating separate geographic areas within the RSF and corresponding text representing the general human readable names associated therewith; and/or (2) icons showing locations of respective tags within the geographic areas within the RSF.

Figure 2:
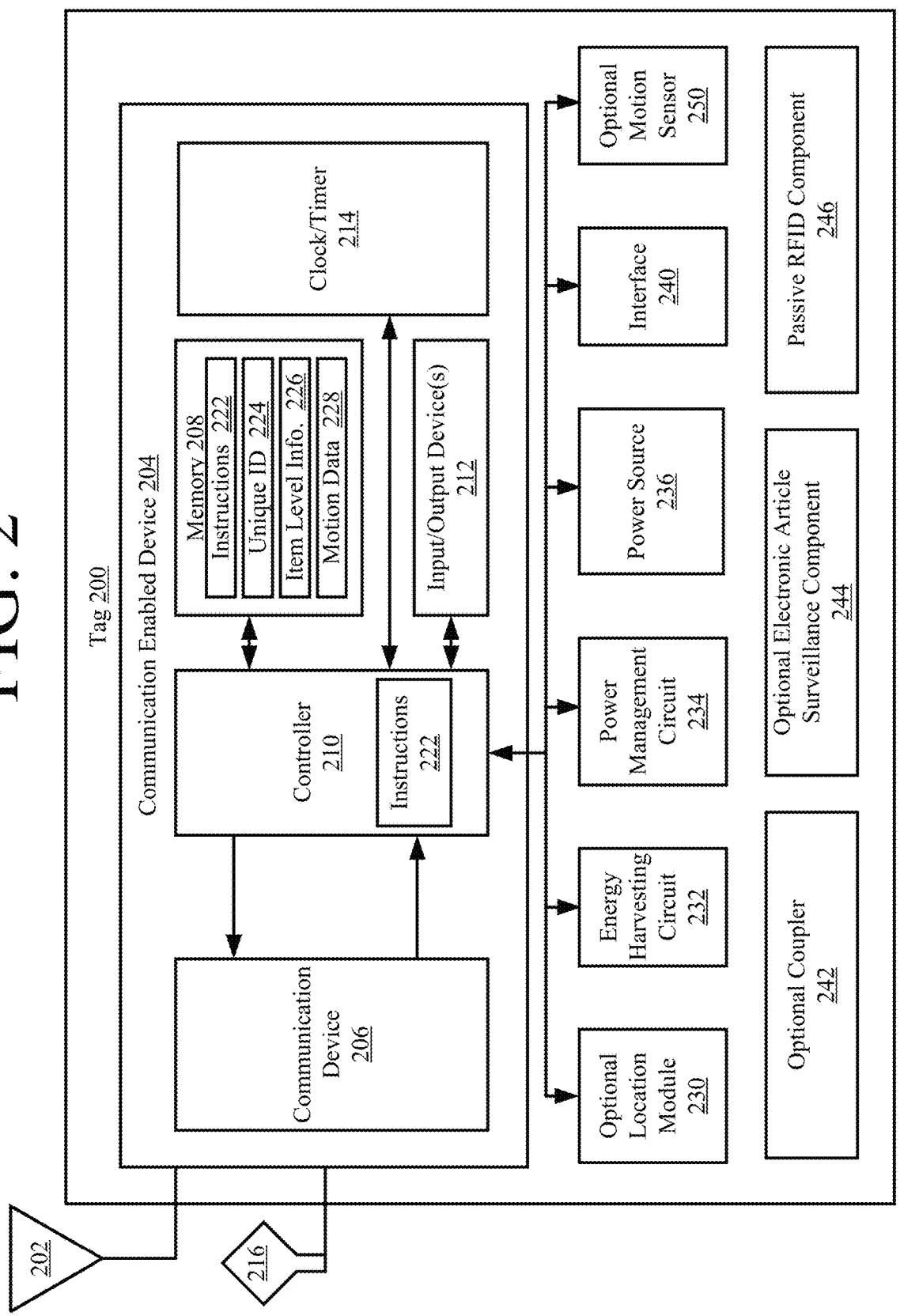
FIG. 2 is an illustration of an illustrative tag.

Referring now to FIG. 2, there is an illustration of an illustrative architecture for a tag 200. RFID tags $112_1, \ldots, 112_N, 118_1, \ldots, 118_X$ of FIG. 1 are the same as or similar to tag 200. As such, the discussion of tag 200 is sufficient for understanding the RFID tags $112_1, \ldots, 112_N, 118_1, \ldots, 118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management. In this regard, the tag 200 is configured for allowing data to be exchanged with an external device (e.g., tag readers 120, 130 of FIG. 1 and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology and/or a SRC technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

In some scenarios, these RFID tags can leverage timeslot communication schemes and motion sensing for triggering the timeslot communication schemes. The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 (e.g., an EPC) can be stored in memory 208 of the communication enabled device 204 and/or communicated to other external devices (e.g., tag reader 120 of FIG. 1 and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server) can then store the information in a database (e.g., database 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion data 228 to determine if a match exists therebetween. More specifically, a motion pattern specified by the sensor data can be compared to a plurality of motion patterns specified by the stored motion data 228. The plurality of motion patterns can include, but are not limited to, a motion pattern for walking, a motion pattern for running, a motion pattern for vehicle transport, and/or a motion pattern for vibration caused by equipment or machinery in proximity to the tag (e.g., an air conditioner or fan). The type of movement (e.g., vibration or being carried) is then determined based on which stored motion data matches the sensor data (e.g., by a certain degree such as 75% or more). This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The present solution is not limited in this regard.

Figure 3:
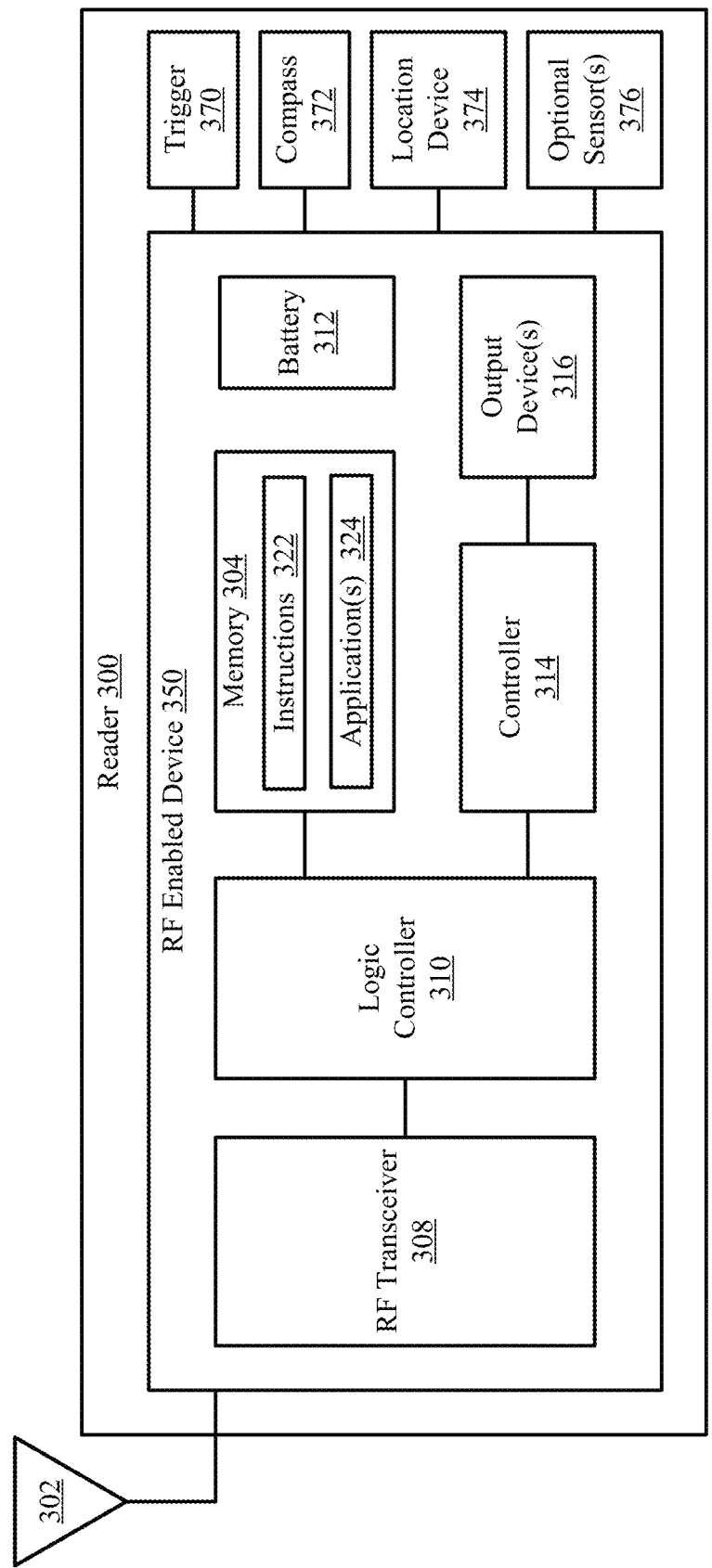
FIG. 3 is an illustration of an illustrative reader.

Referring now to FIG. 3, there is provided a detailed block diagram of an illustrative reader (or tag reader) 300. Tag readers 120, 130 of FIG. 1 are the same as or similar to reader 300. As such, the discussion of reader 300 is sufficient for understanding tag readers 120, 130.

Reader 300 may include more or less components than that shown in FIG. 3. However, the components shown are sufficient to disclose an illustrative embodiment implementing the present solution. Some or all of the components of the reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an embodiment of a representative reader 300 configured to facilitate improved object locating within an RSF (e.g., RSF 128 of FIG. 1). In this regard, the reader 300 comprises an RF enabled device 350 for allowing data to be exchanged with an external device (e.g., RFID tags $112_1, \ldots, 112_N$, $118_1, \ldots, 118_X$ of FIG. 1) via RF technology. The components 304-316 shown in FIG. 3 may be collectively referred to herein as the RF enabled device 350, and include a power source 312 (e.g., a battery).

The RF enabled device 350 comprises an antenna 302 for allowing data to be exchanged with the external device via RF technology (e.g., RFID technology or other RF based technology). The external device may comprise RFID tags $112_1, \ldots, 112_N, 118_1, \ldots, 118_X$ of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RFID transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the location of RFID tags within a facility (e.g., RSF 128 of FIG. 1). Accordingly, the logic controller 310 can store the extracted information in memory 304, and execute algorithms using the extracted information. For example, the logic controller 310 can perform operations to correlate its own tag reads with tag reads made by other tag readers (static or mobile) to determine the location of the RFID tags within the facility.

Notably, memory 304 may be a volatile memory and/or a non-volatile memory. For example, the memory 304 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to where RFID tags are located within a facility. Other functions of the RF enabled device 350 will become apparent as the discussion progresses.

The reader 300 may also comprise a trigger which can be manually depressed to initiate tag read operations. The tag read operations can additionally or alternatively be performed automatically in accordance with a given application. The reader 300 may further comprises a location device 374 for determining the location of the reader within the RSF 128. An optional sensor(s) 376 can be provided to increase the accuracy of the determined location. The optional sensor(s) include, but are not limited to, a proximity sensor. The proximity sensor detects the distance from the reader 300 to another object. The distance can be used to compute a more precise reader location.

A compass 372 is provided to determine the pointing direction of the reader 300 at the time of each tag read. As the reader's 300 pointing direction and location are known at the time of an RFID tag read, the physical location of the RFID tag can be deduced, as discussed below. A location confidence value is computed for each physical location deduced for each tag involved. The location confidence value is computed based on the number of reads, an average Received Signal Strength Indicator ("RSSI"), a max RSSI, and/or the reader's power level at the time of a tag read.

In some scenarios, the location confidence value is computed in accordance with the following mathematical equation (1).

$$CV = w_1 N + w_2 A + w_3 M + w_4 P \qquad (1)$$

where CV represents a location confidence value, N represents a number of reads, A represents an average RSSI, M represents a max RSSI, P represents the reader's power level at the time of a tag read, and $w_1$-$w_4$ represent weighting values. The present solution is not limited to the particulars of this scenario.

The tag locations and location confidence values can be determined by the reader and/or by a remote computing device, such as server. A detailed block diagram of an exemplary architecture for a server 400 is provided in FIG. 4. Server 124 of FIG. 1 is the same as or substantially similar to server 400. As such, the following discussion of server 400 is sufficient for understanding server 124.

Figure 4:
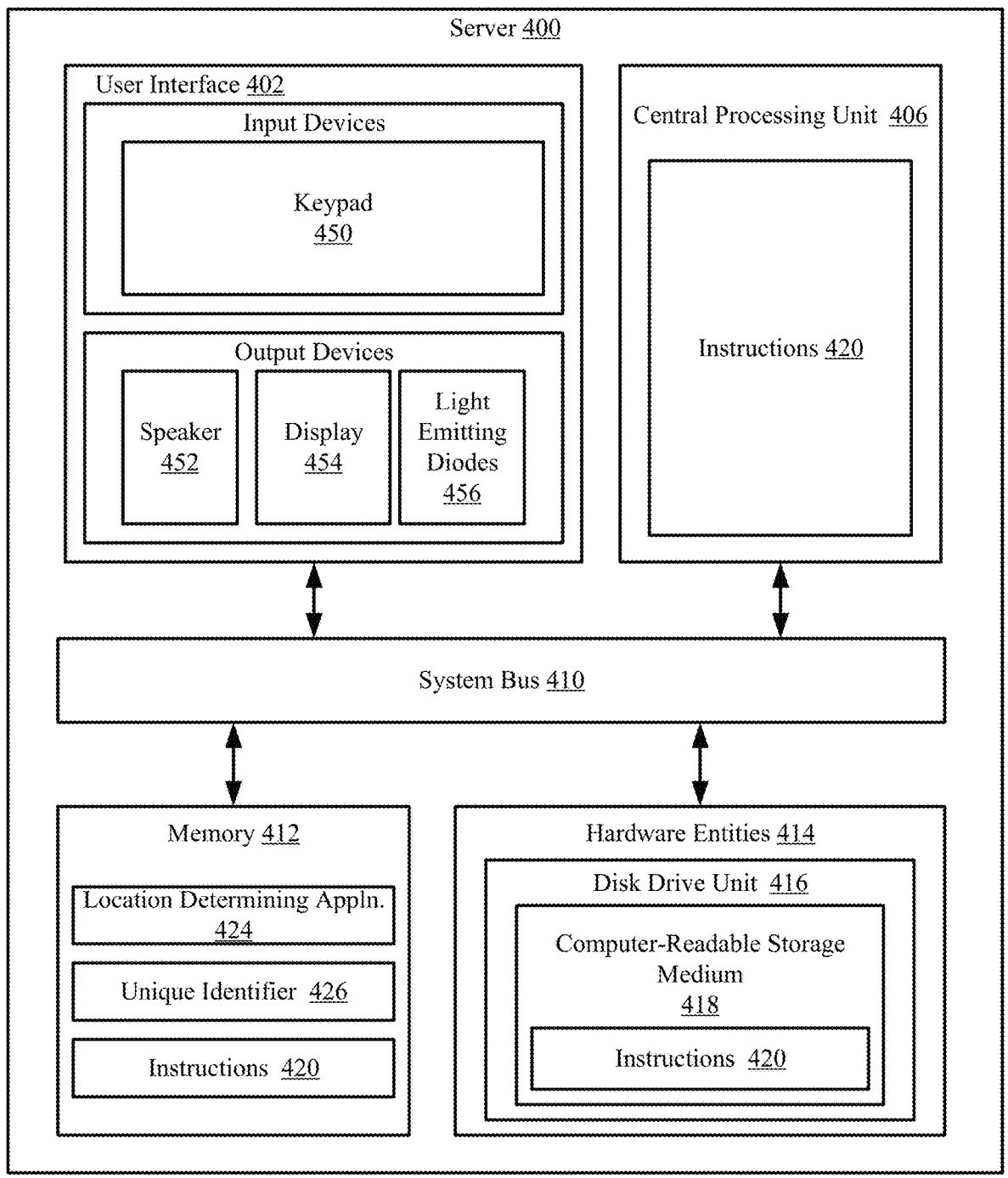
FIG. 4 is an illustration of an illustrative server.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate (a) tag location determinations, (b) tag location confidence value computations, and/or (c) the provision of a three dimensional map showing locations of RFID tags (e.g., RFID tags $112_1, \ldots, 112_N, 118_1, \ldots, 118_N$ of FIG. 1) within an RSF (e.g., RSF 128 of FIG. 1). As such, the server 400 of FIG. 4 implements at least a portion of the methods described herein.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the server 400 comprises a user interface 402, a Central Processing Unit ("CPU") 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three dimensional map showing locations of RFID tags within a facility. In this regard, it should be understood that the electronic circuit can access and run a location determining application 424 installed on the server 400. The software application 424 is generally operative to facilitate: the determination of RFID tag locations within a facility; and the mapping of the RFID tag locations in a virtual three dimensional space. The software application 424 is also operative to use product identification codes (e.g., tag SKU information) to group tags into product (e.g., SKU) areas; determine generic human readable names for the product (e.g., SKU) areas; and add visual lines and/or text to the map for visually showing product (e.g., SKU) areas. Other functions of the software application 424 will become apparent as the discussion progresses.

Figure 5:
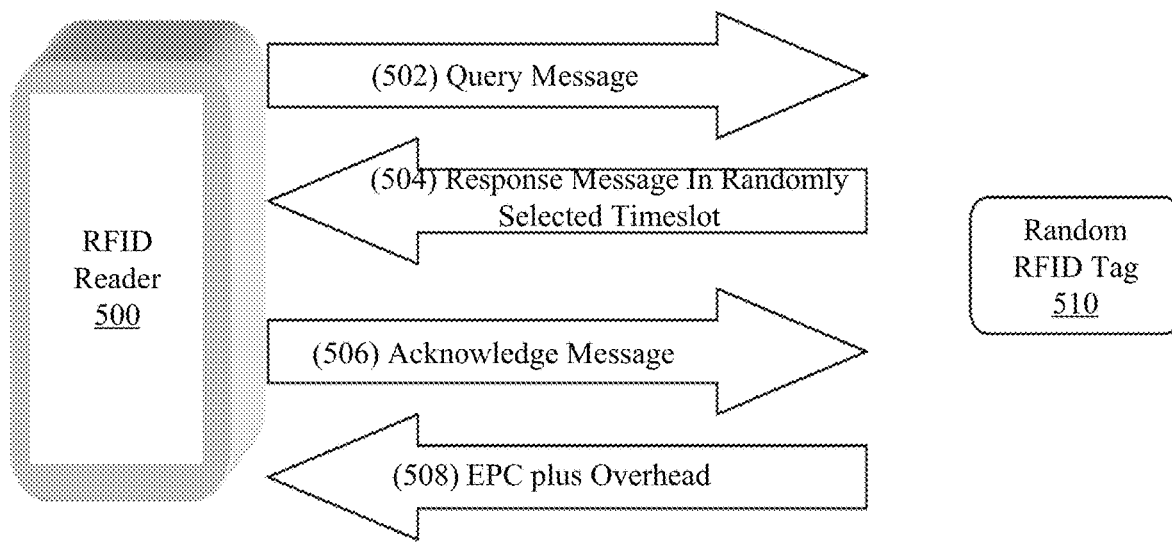
FIG. 5 is an illustration of an illustrative standard EPC inventory round.
Figure 6:
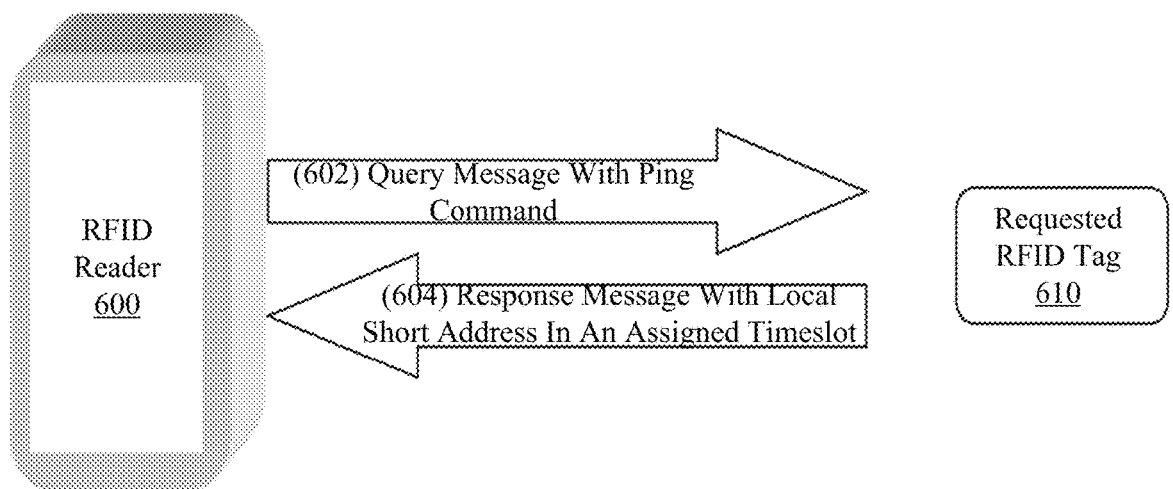
FIG. 6 is an illustration of an illustrative enhanced EPC inventory round.

Referring now to FIGS. 5 and 6, there are provided illustrations that are useful for understanding the difference between a standard EPC inventory round and an enhanced EPC inventory round in accordance with the present solution. As shown in FIG. 5, the standard EPC inventory round involves: (502) communicating a query message from an RFID reader 500; generating a random number by each RFID tag 510 that received the query message; (504) communicating a response message in a time slot having a number that matches the generated random number; receiving the response message by the RFID reader 500; (506) communicating an acknowledge message from the RFID reader 500; receiving the acknowledgment message by the RFID tag 510; (508) communicating an EPC code and overhead bits from the RFID tag 510; and receiving the EPC code and overhead bits at the RFID reader 500. In accordance with this standard EPC inventory round process, the time it takes the RFID reader 500 to determine the position of a single RFID tag 510 is approximately 3,000 microseconds.

As shown in FIG. 6, the enhanced EPC inventory round involves: (602) communicating a query message with a ping command from an RFID reader 600; receiving the query message by an RFID tag 610; (604) communicating a response message with a local short address from the RFID tag 610 in an assigned timeslot; and receiving the response message by the RFID reader 600. Notably, operations (506) and (508) of the standard EPC inventory round process have been eliminated here. Thus, the time it takes the RFID reader 600 to determine the position of a single RFID tag 610 in accordance with this enhanced EPC inventory round process, is approximately 200 micro-seconds. Accordingly, the enhanced EPC inventory round process is much faster than the standard EPC inventory round process. It should also be noted that operations (502) and (504) of FIG. 5 have been modified here to make them more reliable (with collisions and/or empty timeslots) and deterministic. As such, the enhanced EPC inventory round process is also a more deterministic and reliable method as compared to the standard EPC inventory round process.

Figure 7:
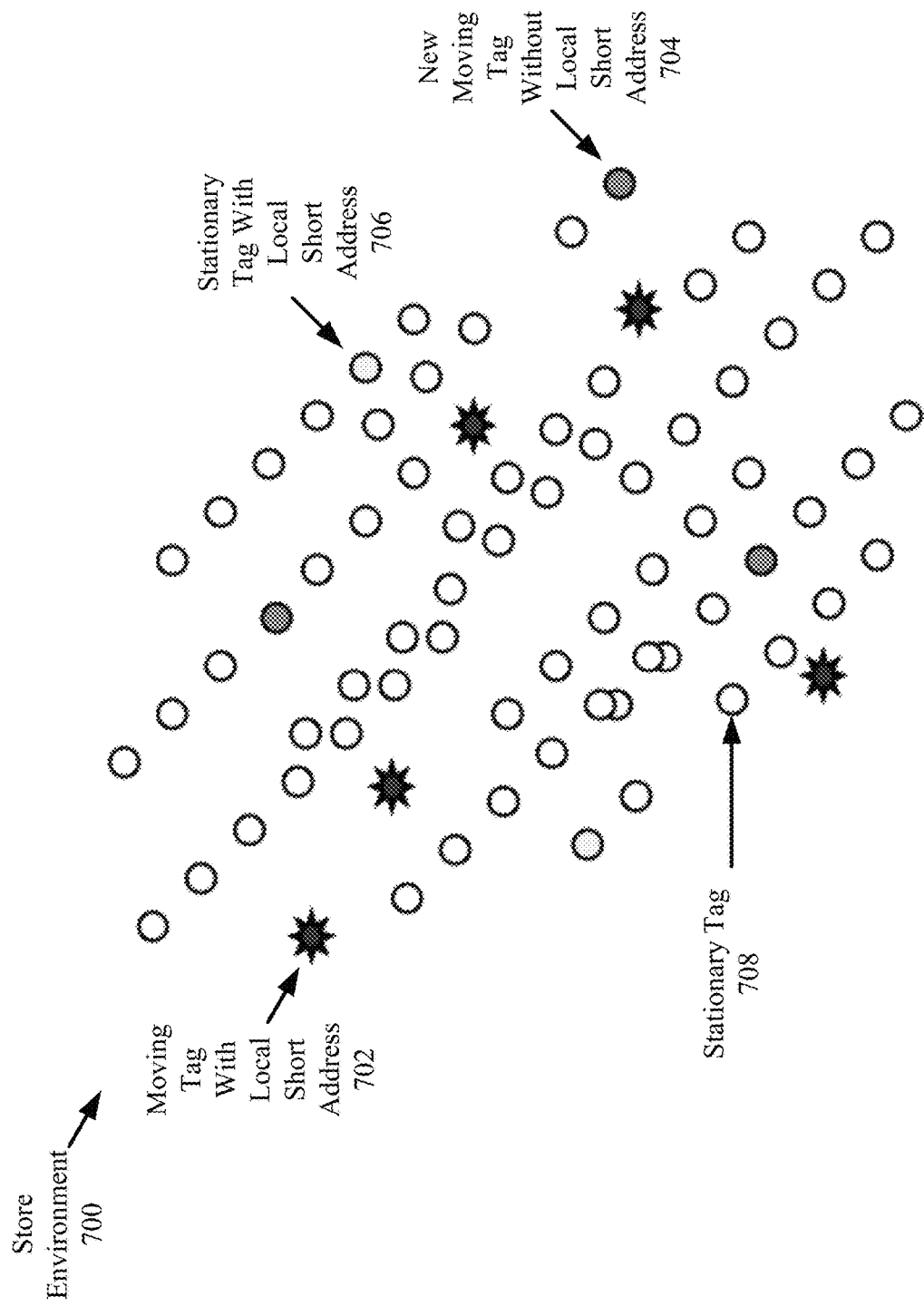
FIG. 7 is an illustration of an illustrative store environment.

Referring now to FIG. 7, there is provided an illustration of an illustrative store environment 700. This drawing illustrates how a dense store environment is effectively reduced to a relatively small population of tags of interest when the enhanced EPC inventory round process is employed. In effect, the position tracking of tags is improved. Also, specific tags 702 can be tracked in motion at 16 times the rate of standard EPC without interference from the stationary tags 708.

As shown in FIG. 7, a plurality of RFID tags reside in the store environment 700. These RFID tags include moving tags 702 with local short addresses assigned thereto, new moving tags 704 without local short addresses assigned thereto, stationary tags 708, and stationary tags 706 with local short addresses assigned thereto. By having only moving tags 702 and 704 respond to query messages, the population of tags while an RFID reader performing tag reading operations is greatly reduced. By assigning short local addresses to tags, these tags can be pinged at 16 times the rate of the standard EPC inventory round process making phase measurement fast enough to track the position and motion of many tags simultaneously. All other tags 704, 706, 708 remain quiet during this time.

As evident from FIGS. 5-7, the present solution provides a way to: deterministically obtain responses from a known group of tags such as those closest to an exit and moving towards an exit; obtain sufficient information to accurately compute and correlate phase difference information on many tags in real-time; allow tracking of tag motion through a facility; and allow accurate position and motion determinations at exits. It is important to understand that the present solution can be used with RFID tags absent of any motion sensing capabilities to increase the ability to track tags of interest or for regular inventory confirmation.

Figure 8:
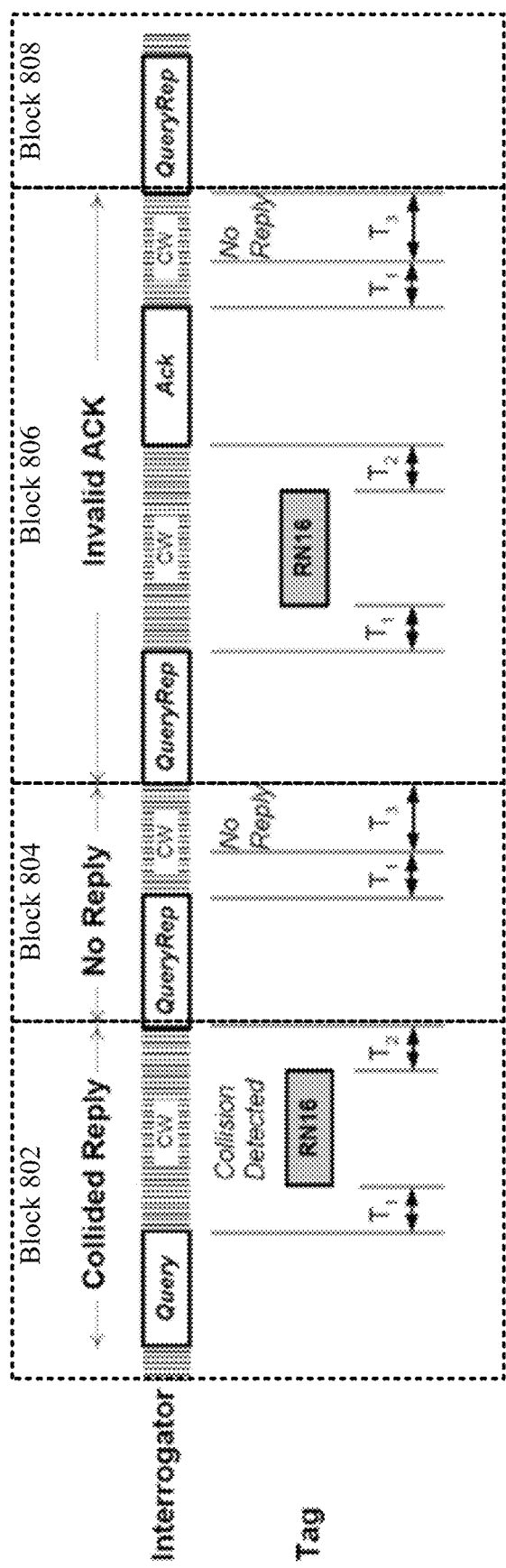
FIG. 8 is an illustration of an illustrative inventory process according to current EPC standard format and timing.

Referring now to FIG. 8, there is provided an illustration of failure states that can occur when the standard EPC inventory process is employed. These failure states include: (1) a collision state in which at least two tags respond to the same query during the same randomly selected timeslot as shown by block 802; (2) a no reply state in which no tags respond to an initial query as shown by block 804; (3) an invalid ACK state in which a given tag does not send its EPC code and overhead bits in response to an acknowledgement message as shown by block 806; and (4) a no reply query repeat state in which no tags respond to a query repeat message as shown by block 808. Failures (1)-(4) contribute to wasted bandwidth in conventional inventory systems employing the standard EPC inventory process. The average time per tag read equals 2,238 μsec (i.e., QueryRep=112 μsec, $T^1$=33 μsec, RN16=100 μsec, $T_2$=5 μsec, ACK=675 μsec, $T_1$=33 μsec, EPC+header=1,250 μsec, $T_2$=30 μsec (for ACK tag it is longer)). A 50% overhead is added for collisions, no replies, invalid ACK and random selection of tags. The average time per tag is 3,357 μsec.

Figure 9:
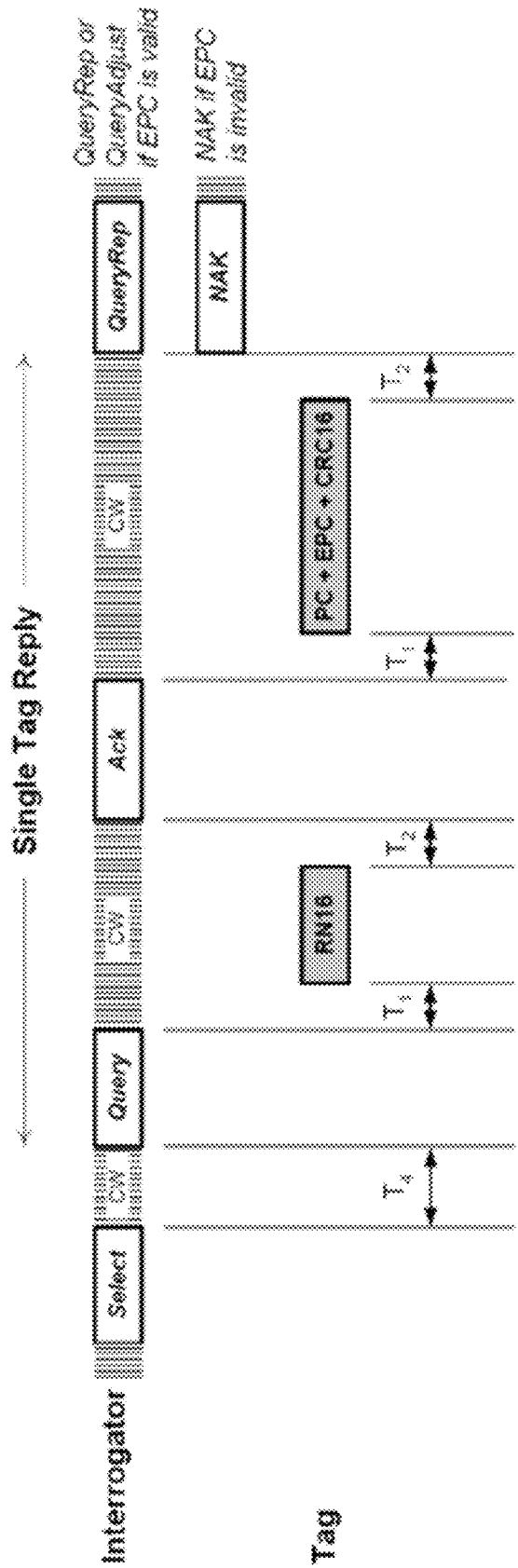
FIG. 9 is an illustration of an illustrative single tag read according to current EPC standard format and timing.

Referring now to FIG. 9, there is provided an illustration of a successful standard EPC inventory process. As noted above in relation to FIG. 5, the process involves: communicating a query message from an interrogator (i.e., an RFID reader); receiving the query message at a tag; communicating a response message (16 bits) from the tag during a randomly selected timeslot; communicating an acknowledgement message from the interrogator; receiving the acknowledgement message by the tag; and communicating an EPC code and overhead bits from the tag in response to the acknowledgement message. Next, the interrogator performs query repeat operations.

Figure 10:
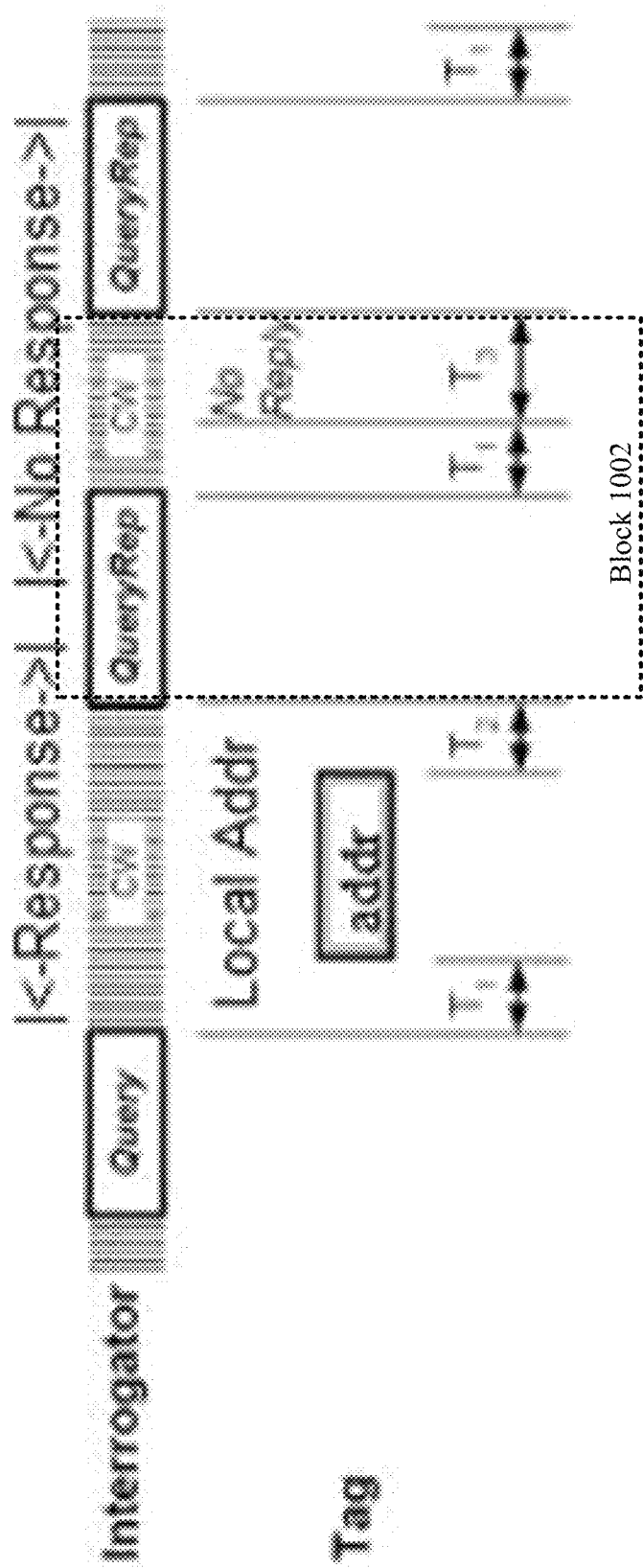
FIG. 10 is an illustration of an illustrative inventory process according to enhanced EPC standard format and timing.

Referring now to FIG. 10, there is provided an illustration of a failure state that can occur when the enhanced EPC inventory process is employed. The failure state includes a no reply query repeat state in which the tag with the assigned address does not respond to a query repeat message, as shown by block 1002. This can occur when the tag has moved out of range of the RFID reader. Notably, the enhanced EPC inventory process is absent of a collision state, a no reply state, and an invalid ACK state. The read time per tag is 200 μsec (i.e., QueryRep=100 μsec, $T_1$=33 μsec, Addr=62 μsec, $T_2$=5 μsec). This is approximately 16 times faster than the standard EPC inventory process to determine a tag's position.

Figure 11:
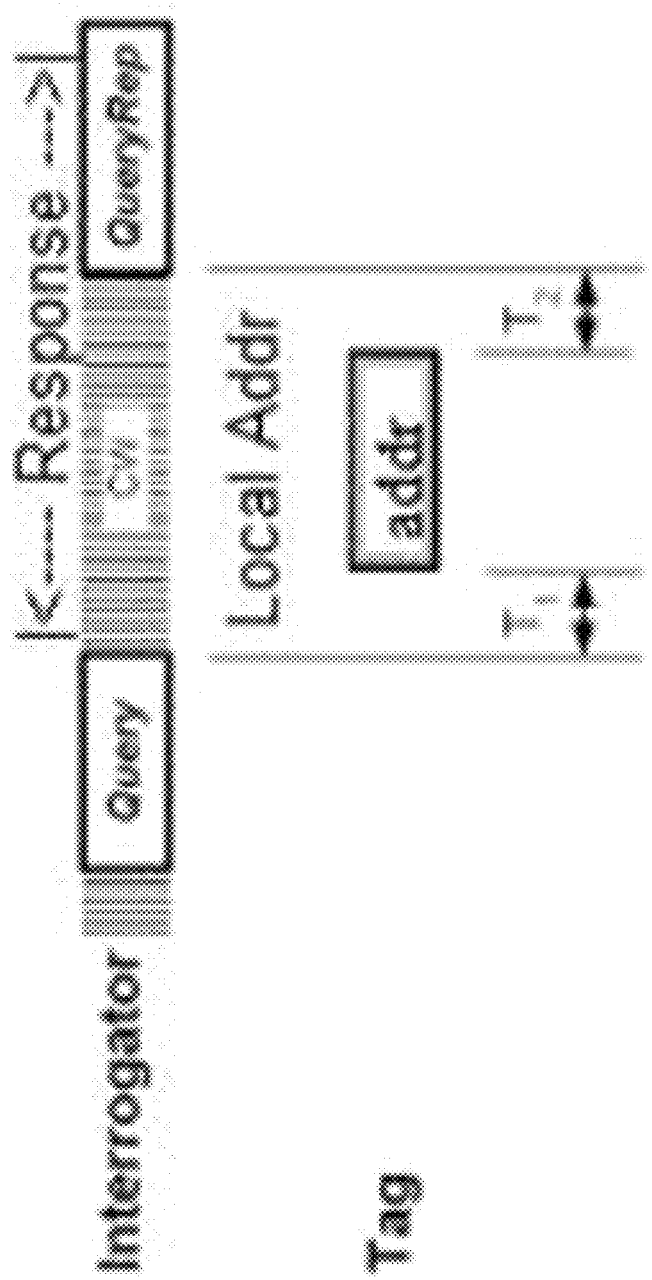
FIG. 11 is an illustration of an illustrative single tag read according to enhanced EPC standard format and timing.

Referring now to FIG. 11, there is provided an illustration of a successful enhanced EPC inventory process. As noted above in relation to FIG. 6, the process involves: communicating a query message with a ping command from an interrogator (i.e., an RFID reader); receiving the query message at a tag; and communicating a response message with a local short address from the tag during an assigned timeslot. Next, the interrogator performs query repeat operations. Notably, the phase can be determined based on the local short address response. This phase is used to determine the tag's position.

Illustrative Methods for Locating a Tag in a Facility

Figure 12:
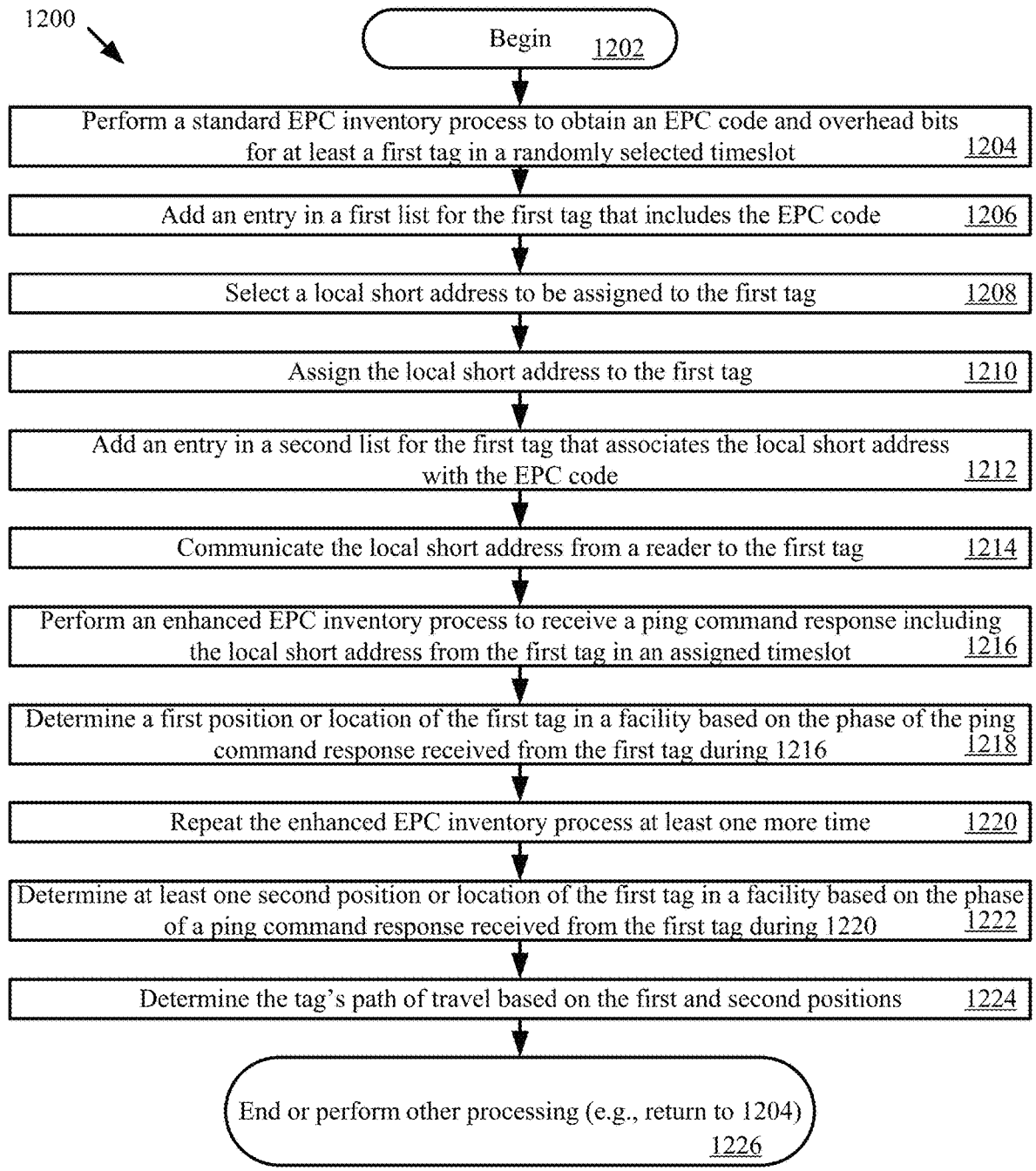
FIG. 12 is a flow diagram of an illustrative method for determining a tag's (e.g., position in a facility).

Referring now to FIG. 12, there is provided a flow diagram of an illustrative method 1200 for determining an RFID tag's position in a facility (e.g., RSF 128 of FIG. 1). Method 1200 begins with 1202 and continues to 1204 where a standard EPC inventory process is performed to obtain an EPC code and overhead bits from at least a first tag (e.g., RFID tag 112₁ of FIG. 1) in a randomly selected timeslot. The EPC code contains 64 bits, 96 bits or 128 bits. Next in 1206, an entry is added in a first list for the first tag that includes the EPC code. A local short address is then selected in 1208 and assigned to the first tag in 1210. The local short address comprises a significantly smaller number of bits than the EPC code. For example, in some scenarios, the local short address comprises less than (e.g., 1-50% of) the total number of bits contained in the EPC code (e.g., the local short address comprises 10 bits). In 1212, an entry is added to a second list for the first tag that associates the local short address with the EPC code. The local short address is communicated from a reader (e.g., RFID reader 120 of FIG. 1) to the first tag. The first tag stores the local short address in its local memory (e.g., memory 208 of FIG. 2).

Subsequently, an enhanced EPC inventory process is performed as shown by 1216. During this process, a ping command response is received by the reader from the RFID tag. The ping command response includes the local short address. In some scenarios, the RFID tag only responds to a query from the reader when its local sensor (e.g., sensor 250 of FIG. 2) detects motion. The present solution is not limited in this regard. In 1218, a first position or location of the first tag in the facility is determined based on the phase of the ping command response received from the first tag during the enhanced EPC inventory process.

The enhanced EPC inventory process is repeated at least one more time in 1220. At least one second position or location of the first tag is determined in 1222 based on the phase of the ping command response received from the first tag in 1220. The first tag's path of travel is then determined in 1224 based on the first and second positions. Subsequently, 1226 is performed where method 1200 ends or other processing is performed (e.g., return to 1204).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for determining a tag's position in a given area, comprising:
    performing, by a tag reader, a standard inventory process to obtain a unique identification code for a first tag in a randomly selected timeslot;
    assigning, by the tag reader, a local short address to the first tag that is shorter than the unique identification code;
    wirelessly communicating the local short address from the tag reader to the first tag;
    performing, by the tag reader, an enhanced inventory process to receive a ping command response signal including the local short address from the first tag in an assigned timeslot; and
    determining a first position of the first tag in the given area based on the phase of the ping command response signal.

2. The method according to claim 1, wherein the unique identification code comprises an Electronic Product Code ("EPC").

3. The method according to claim 1, wherein the local short address comprises less than a total number of bits contained in the unique identification code which facilitates to track of moving tags.

4. The method according to claim 1, wherein the standard inventory process comprises the following four communication operations:
    communicating a query message from the tag reader;
    receiving a response message communicated from the first tag in a time slot having a number that matches a random number generated by the first tag;
    communicating an acknowledge message from the tag reader; and
    receiving the unique identification code and overhead bits communicated from the first tag in response to the acknowledge message.

5. The method according to claim 1, wherein the enhanced inventory process comprises only the two following communication operations:
    communicating a ping command from the tag reader that includes instructions for the first tag to send the ping command response signal during the assigned timeslot of a plurality of contiguous timeslots; and
    receiving the ping command response signal sent from the first tag during the assigned timeslot.

6. The method according to claim 1, wherein the first tag communicates the ping command response signal only if the first tag is in motion.

7. The method according to claim 1, further comprising repeating the enhanced inventory process by the tag reader to determine at least one second position of the first tag in the given area.

8. The method according to claim 6, further comprising determining the first tag's path of travel through the given area based on the first position and the at least one second position.

9. The method according to claim 1, further comprising re-assigning another local short address to the first tag when a collision event occurs that involves the first tag.

10. The method according to claim 1, wherein a unique reader code assigned to the tag reader is included in the local short address.

11. The method according to claim 1, further comprising adding the first tag to a list of moving tags with assigned local short addresses that is maintained by the tag reader.

12. The method according to claim 11, wherein the assigned local short addresses are associated in the list with respective unique identification codes for the moving tags.

13. The method according to claim 11, further comprising removing the first tag from the list when the first tag is no longer in motion, that first tag is no longer responding to ping commands sent from the tag reader, or a collision event occurs that involves the first tag.

14. A system, comprising:
    a processor; and
    a non-transitory computer-readable storage medium comprising programming instructions that are configured to cause the processor to implement a method for determining a tag's position in a given area, wherein the programming instructions comprise instructions to:
        perform a standard inventory process to obtain a unique identification code for a first tag in a randomly selected timeslot;

assign a local short address to the first tag that is shorter than the unique identification code;

wirelessly communicate the local short address to the first tag;

perform an enhanced inventory process to receive a ping command response signal including the local short address from the first tag in an assigned timeslot; and determine a first position of the first tag in the given area based on the phase of the ping command response signal.

15. The system according to claim 14, wherein the unique identification code comprises an Electronic Product Code ("EPC").

16. The system according to claim 14, wherein the local short address comprises less than a total number of bits contained in the unique identification code which facilitates to track of moving tags.

17. The system according to claim 14, wherein the standard inventory process comprises the following four communication operations:

communicating a query message;

receiving a response message communicated from the first tag in a time slot having a number that matches a random number generated by the first tag;

communicating an acknowledge message; and receiving the unique identification code and overhead bits communicated from the first tag in response to the acknowledge message.

18. The system according to claim 14, wherein the enhanced inventory process comprises only the two following communication operations:

communicating a ping command that includes instructions for the first tag to send the ping command response signal during the assigned timeslot of a plurality of contiguous timeslots; and receiving the ping command response signal sent from the first tag during the assigned timeslot.

19. The system according to claim 14, wherein the first tag communicates the ping command response signal only if the first tag is in motion.

20. The system according to claim 14, wherein the programming instructions further comprise instructions to re-assign another local short address to the first tag when a collision event occurs that involves the first tag.

21. The system according to claim 14, wherein a unique reader code assigned to a tag reader is included in the local short address.

22. The system according to claim 14, wherein the programming instructions further comprise instructions to repeat the enhanced inventory process to determine at least one second position of the first tag in the facility.

23. The system according to claim 22, wherein the programming instructions further comprise instructions to determine the first tag's path of travel through the facility based on the first position and the at least one second position.

24. The system according to claim 14, wherein programming instructions comprise instructions to add the first tag to a list of moving tags with assigned local short addresses.

25. The system according to claim 24, wherein the assigned local short addresses are associated in the list with respective unique identification codes for the moving tags.

26. The system according to claim 24, wherein programming instructions further comprise instructions to remove the first tag from the list when the first tag is no longer in motion, that first tag is no longer responding to ping commands, or a collision event occurs involving the first tag.

* * * * *